United States Patent
Suciu et al.

(10) Patent No.: US 10,526,915 B2
(45) Date of Patent: Jan. 7, 2020

(54) FIREWALL MOUNT HUB

(71) Applicant: United Technologies Corporation, Farmington, CT (US)

(72) Inventors: Gabriel L. Suciu, Glastonbury, CT (US); Jesse M. Chandler, South Windsor, CT (US); Brian D. Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 757 days.

(21) Appl. No.: 15/062,442

(22) Filed: Mar. 7, 2016

(65) Prior Publication Data
US 2017/0254219 A1    Sep. 7, 2017

(51) Int. Cl.
| | | |
|---|---|---|
| *F01D 25/08* | (2006.01) | |
| *F02C 7/25* | (2006.01) | |
| *F02C 7/36* | (2006.01) | |
| *F02C 7/32* | (2006.01) | |
| *F01D 25/20* | (2006.01) | |
| *F02C 7/22* | (2006.01) | |
| *F04D 19/02* | (2006.01) | |
| *F04D 27/00* | (2006.01) | |
| *F04D 29/56* | (2006.01) | |

(52) U.S. Cl.
CPC ............ *F01D 25/08* (2013.01); *F01D 25/20* (2013.01); *F02C 7/22* (2013.01); *F02C 7/25* (2013.01); *F02C 7/32* (2013.01); *F02C 7/36* (2013.01); *F04D 19/02* (2013.01); *F04D 27/009* (2013.01); *F04D 29/563* (2013.01); *F05D 2220/32* (2013.01); *F05D 2260/231* (2013.01)

(58) Field of Classification Search
CPC .... F01D 25/24; F02C 7/32; F02C 7/25; F02C 7/36
See application file for complete search history.

(56) References Cited

U.S. PATENT DOCUMENTS

| | | | |
|---|---|---|---|
| 3,965,673 A * | 6/1976 | Friedrich | ............... B64D 13/06 60/39.15 |
| 4,961,588 A | 10/1990 | Brienza | |
| 5,014,917 A | 5/1991 | Sirocky et al. | |
| 5,091,605 A | 2/1992 | Clifford | |
| 5,156,360 A | 10/1992 | Shine | |
| 5,275,530 A | 1/1994 | Kujawa et al. | |
| 5,299,811 A | 4/1994 | Kershaw | |
| 5,458,343 A | 10/1995 | Dornfeld et al. | |

(Continued)

FOREIGN PATENT DOCUMENTS

| | | | | | |
|---|---|---|---|---|---|
| EP | | 1308611 A2 | 5/2003 | | |
| EP | | 2860412 A1 | 4/2015 | | |
| WO | WO 2014133724 A1 * | | 9/2014 | ........... | F01D 17/162 |

OTHER PUBLICATIONS

European Search Report for European Application No. 17158992.2 dated Jul. 28, 2017.

*Primary Examiner* — Steven M Sutherland
*Assistant Examiner* — Thuyhang N Nguyen
(74) *Attorney, Agent, or Firm* — Carlson, Gaskey & Olds, P.C.

(57) ABSTRACT

A gas turbine engine comprises an engine having a compressor section, and a turbine section. A firewall and accessory pumps are mounted on a downstream side of the firewall. The accessory pumps are driven by electric motors mounted on the firewall on an upstream side of the firewall.

20 Claims, 4 Drawing Sheets

(56) References Cited

U.S. PATENT DOCUMENTS

| | | | |
|---|---|---|---|
| 5,867,979 A * | 2/1999 | Newton | F02C 3/113 |
| | | | 310/90.5 |
| 8,607,578 B2 * | 12/2013 | Fert | F02C 7/32 |
| | | | 60/797 |
| 9,416,734 B2 * | 8/2016 | Thies | F02C 7/32 |
| 2006/0248900 A1 * | 11/2006 | Suciu | F02C 7/32 |
| | | | 60/802 |
| 2010/0057957 A1 * | 3/2010 | Smilg | G05B 19/042 |
| | | | 710/104 |
| 2010/0242496 A1 * | 9/2010 | Cass | F02C 7/32 |
| | | | 60/802 |
| 2013/0341547 A1 | 12/2013 | LeBlanc et al. | |
| 2014/0090386 A1 * | 4/2014 | Cloft | F02C 7/32 |
| | | | 60/772 |

\* cited by examiner

FIREWALL MOUNT HUB

BACKGROUND OF THE INVENTION

This application relates to a gas turbine engine, wherein a firewall between a cooler engine portion and a hotter engine portion is utilized to mount components.

Gas turbine engines are known and typically include a fan delivering air into a bypass duct as propulsion air. The fan also delivers air into a compressor. Typically, the compressor includes a lower stage and a higher pressure stage. From the higher pressure stage compressor, the air passes into a combustor where it is mixed with fuel and ignited. Products of this combustion pass downstream over turbine rotors causing them to rotate. The turbine rotors, in turn, drive the compressor and fan rotors.

As can be appreciated, a number of accessories are required to operate a gas turbine engine. As an example, a lubrication pump and a fuel pump must be provided.

A firewall is typically positioned as part of a gas turbine engine. The firewall extends across an inner housing and separates a "cool" side of the engine from a "hot" side of the engine. Typically, the firewall is positioned between the lower and higher pressure compressors.

The lubrication and fuel pumps must be located in the hot side. Thus, as known in the art, mechanically driven accessory gearboxes have been utilized to drive these pumps.

SUMMARY OF THE INVENTION

In a featured embodiment, a gas turbine engine comprises an engine having a compressor section, and a turbine section. A firewall and accessory pumps are mounted on a downstream side of the firewall. The accessory pumps are driven by electric motors mounted on the firewall on an upstream side of the firewall.

In another embodiment according to the previous embodiment, the compressor section includes a lower pressure compressor section and a higher pressure compressor section, and the firewall is positioned between the lower and higher pressure compressor rotors.

In another embodiment according to any of the previous embodiments, a controller providing control signals to the motors is also mounted on the upstream side of the firewall.

In another embodiment according to any of the previous embodiments, the higher pressure compressor is provided with variable vanes and an actuator mechanism for the variable vanes is at the downstream side of the firewall, with a motor for driving the actuator mechanism mounted on the upstream side of the firewall.

In another embodiment according to any of the previous embodiments, the pumps include a fuel pump and an oil pump.

In another embodiment according to any of the previous embodiments, a data and power bus is provided on the upstream side of the firewall to provide power and control to the electric motors.

In another embodiment according to any of the previous embodiments, the controller also communicates with the data and power bus.

In another embodiment according to any of the previous embodiments, the firewall includes openings at an inner periphery to receive air, and the openings communicate with a manifold formed radially across an extent of the firewall.

In another embodiment according to any of the previous embodiments, there are a plurality of the manifolds positioned circumferentially spaced about the firewall.

In another embodiment according to any of the previous embodiments, there are intermediate structural portions between the circumferentially spaced manifolds.

In another embodiment according to any of the previous embodiments, a bypass duct is positioned radially outward of the compressor section, and outlet ports of the manifold communicating air into a bypass stream in the bypass duct.

In another embodiment according to any of the previous embodiments, the higher pressure compressor is provided with variable vanes and an actuator mechanism for the variable vanes is at the downstream side of the firewall, with a motor for driving the actuator mechanism mounted on the upstream side of the firewall.

In another embodiment according to any of the previous embodiments, the firewall includes openings at an inner periphery to receive air, and the openings communicate with a manifold formed radially across an extent of the firewall.

In another embodiment according to any of the previous embodiments, there are a plurality of the manifolds positioned circumferentially spaced about the firewall.

In another embodiment according to any of the previous embodiments, there are intermediate structural portions between the circumferentially spaced manifolds.

In another embodiment according to any of the previous embodiments, the electric motors are mounted on the intermediate structural portions.

In another embodiment according to any of the previous embodiments, a bypass duct is positioned radially outward of the compressor section, and an outlet port of the manifold communicating air into a bypass stream in the bypass duct.

In another embodiment according to any of the previous embodiments, a controller for providing control signals to the motors is also mounted on the upstream side of the firewall.

In another embodiment according to any of the previous embodiments, a data and power bus is provided on the upstream side of the firewall to provide power and control to the electric motors.

In another embodiment according to any of the previous embodiments, a controller for the motors also communicates with the data and power bus.

These and other features may be best understood from the following drawings and specification.

DETAILED DESCRIPTION

Figure 1:
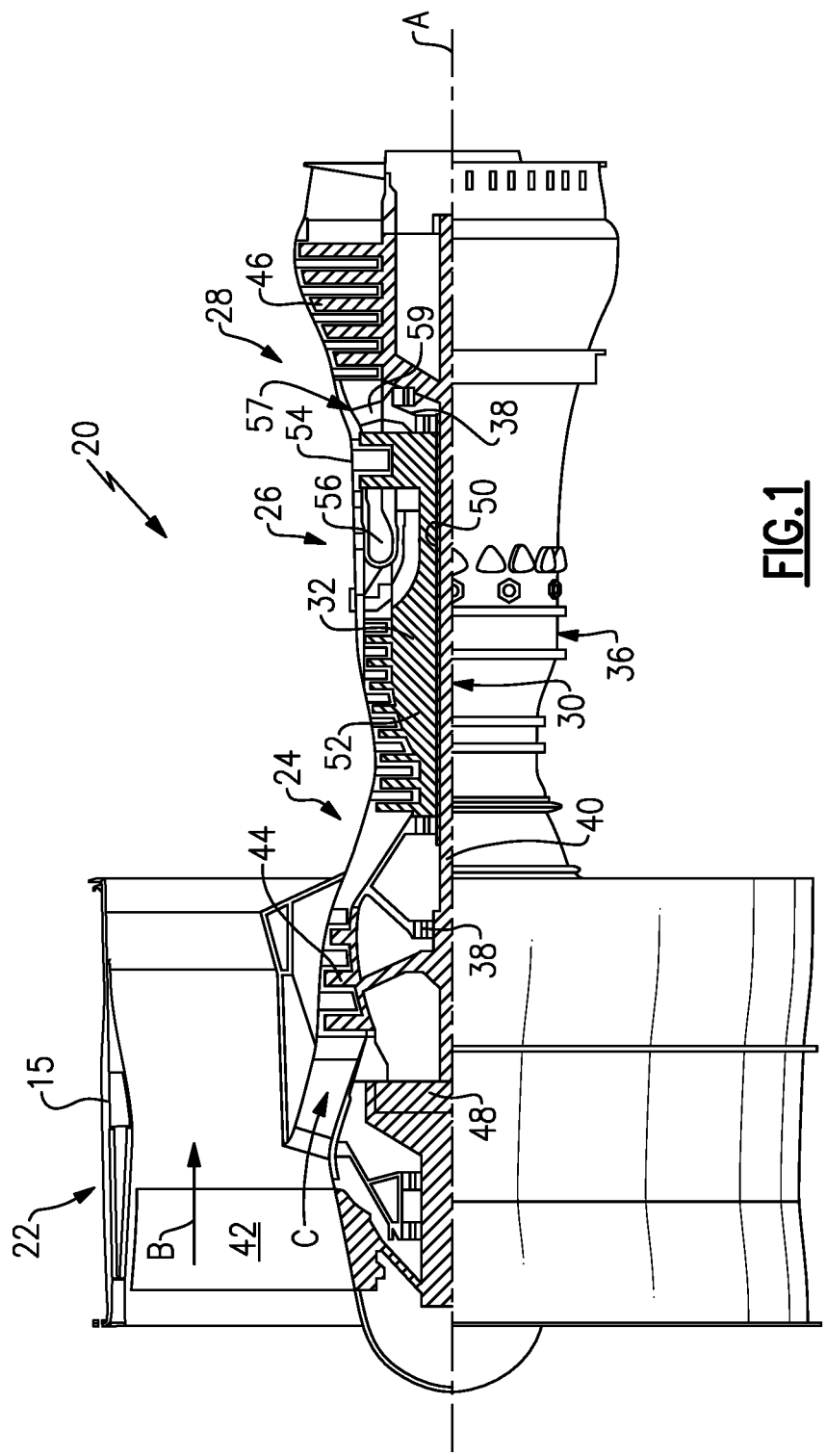
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
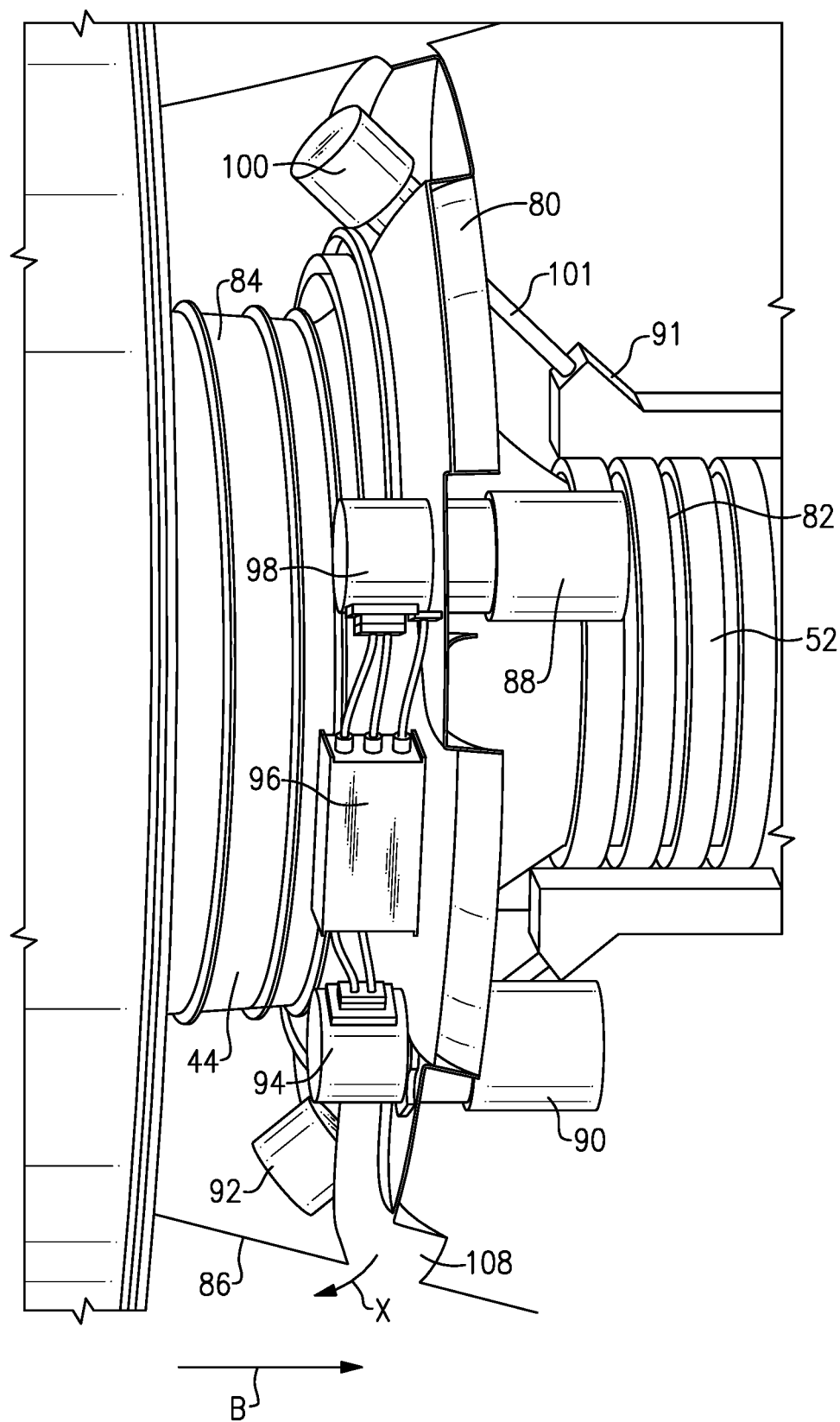
FIG. 2 shows a firewall.

A firewall 80 is illustrated in FIG. 2 separating a downstream hot side 82 of the engine from an upstream cool side 84. Cool side 84 ends adjacent a downstream end of the low pressure compressor and the hot side 82 begins just upstream of the higher pressure compressor 52. As illustrated, the firewall 80 is positioned inwardly of an outer housing 86 which defines the bypass flow passage.

As shown near the bottom, manifold outlet ports 108 deliver compressor bleed air, as shown schematically at X, across the housing 86 and into the bypass flow B. This will be explained below.

On the hot side of the firewall 80, pumps 88 and 90 are mounted. While two pumps are illustrated, there may be more. In addition, the actuation mechanism 91 drives variable vanes to adjust an angle of incidence. The mechanism 91 and the pumps 88 and 90 all require motors. It has generally not been desirable to mount electric motors within the hot side 82. Thus, as mentioned, hydraulic actuators and mechanically driven gearboxes have been utilized.

As illustrated in FIG. 2, motors 92 and 100 for the mechanism 91 are mounted on the cool side of the firewall 80. Motor 100 extends through an opening in the firewall to drive shaft 101 for driving the actuation mechanism 91. In addition, an electric motor 94 drives pump 90 and an electric motor 98 drives pump 88. An electric controller 96 communicates with all of the motors and may be a separate controller or may be the FADEC.

As will be explained, air passing through duct in the firewall further provides an isolation blanket ensuring the motors are better protected from the heat from the hot side 82.

Figure 3:
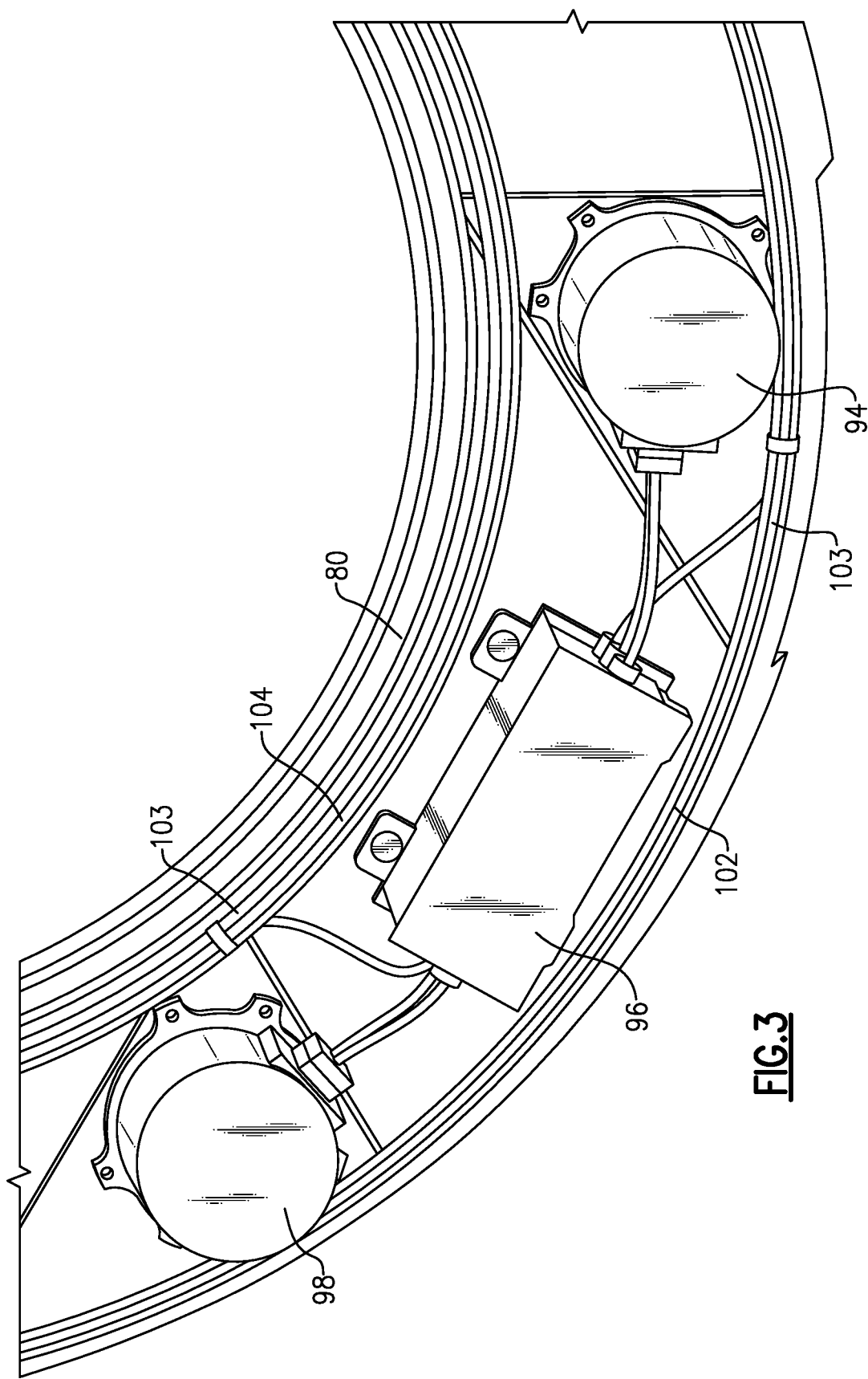
FIG. 3 shows a detail of the firewall.

As shown in FIG. 3, there are channels 102 and 104 which carry data and power buses 103. The motor 98 may drive pump 88, which may be the fuel pump. The motor 94 may drive pump 90, which may be an oil pump.

Figure 4A:
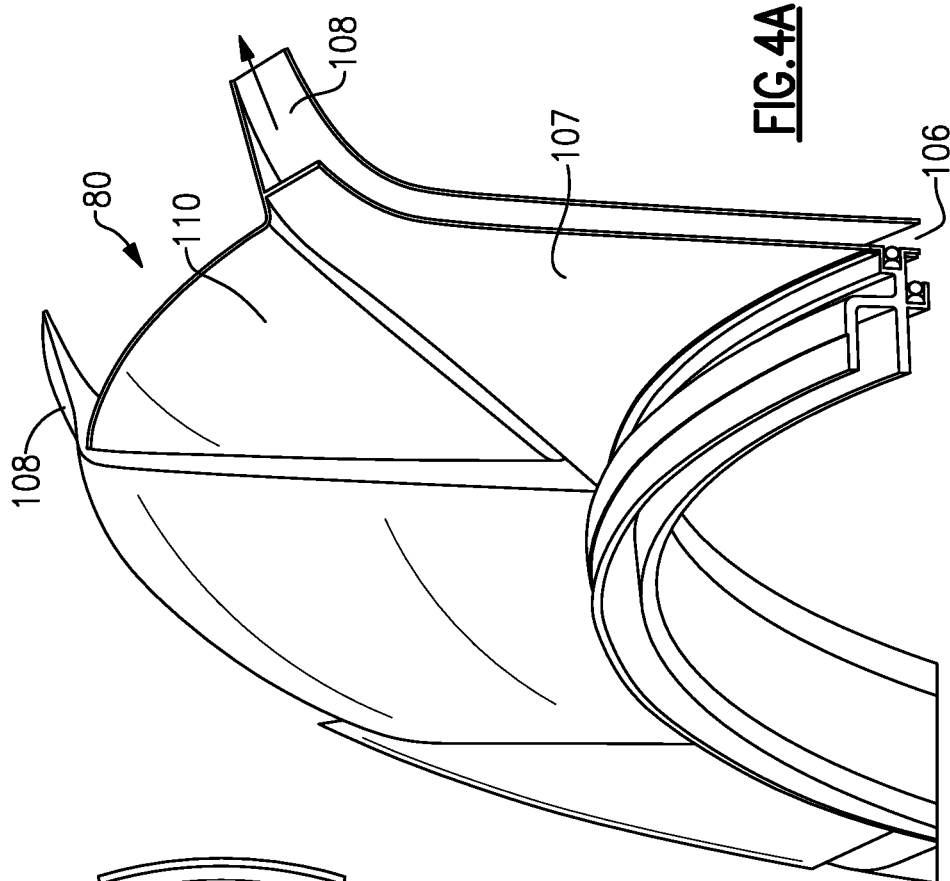
FIG. 4A shows another detail.
Figure 4B:
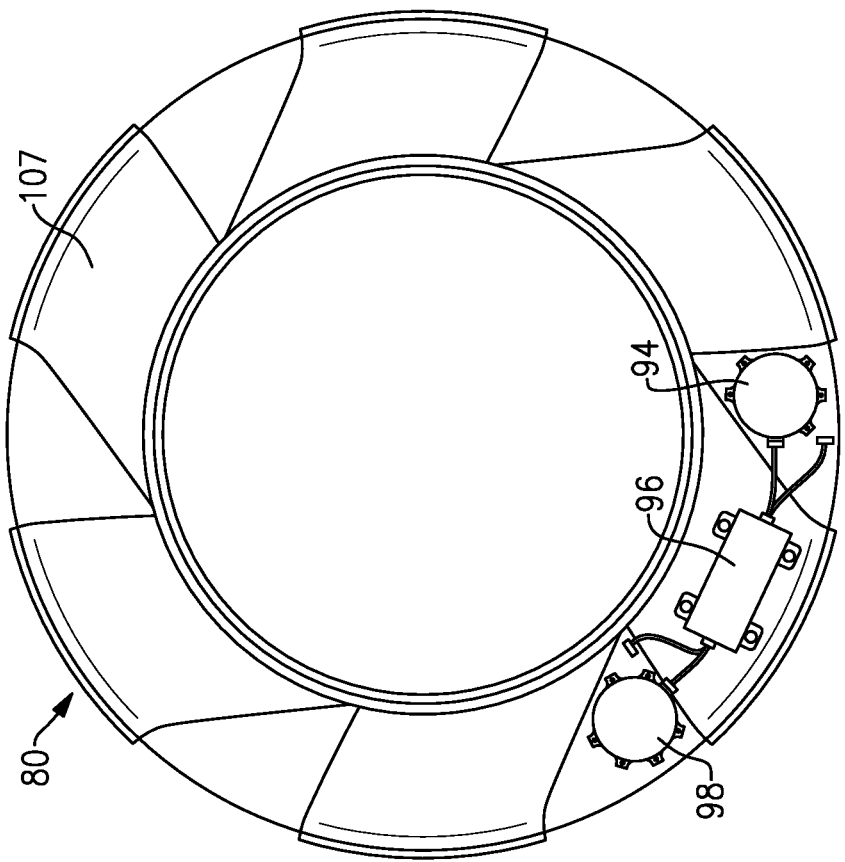
FIG. 4B shows yet another detail.

FIG. 4A shows details of the cooling air passage. An inlet or opening 106 at an inner periphery leads into the manifolds 107 and to the outlet ports 108. There are a plurality of circumferentially spaced manifolds 107 each having an inlet or opening 106 and outlet ports 108. Intermediate portions 110 are structural and may provide a good location for motors to be mounted. This is shown in FIG. 4B.

The motor shafts extend through the firewall in portions 110. The sealing is accomplished by the motor and/or the pump being bolted flush to the firewall and thus sealing against leakage between the cool and hot sides.

The air tapped into the ducts is compressed air, and will likely be relatively hot compared to the cool side. Still, the air flow in the ducts isolates the cool side from the hot side.

The inlet 106 takes in compressed air downstream of the low pressure compressor and discharged through the outlets 108 into the bypass stream, as mentioned above.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   an engine having a compressor section, and a turbine section;
   a firewall, accessory pumps mounted on a downstream side of said firewall, and said accessory pumps being driven by electric motors mounted on said firewall on an upstream side of said firewall; and
   wherein said compressor section includes a lower pressure compressor section and a higher pressure compressor section, and said firewall is positioned between said lower and higher pressure compressor sections.

2. The gas turbine engine as set forth in claim 1, wherein a controller for providing control signals to said electric motors is also mounted on said upstream side of said firewall.

3. The gas turbine engine as set forth in claim 2, wherein said higher pressure compressor section is provided with variable vanes and an actuator mechanism for said variable vanes is at said downstream side of said firewall, with at least one of said electric motors being for driving said actuator mechanism.

4. The gas turbine engine as set forth in claim 3, wherein said accessory pumps include a fuel pump and an oil pump.

5. The gas turbine engine as set forth in claim 4, wherein a data and power bus is provided on said upstream side of said firewall to provide power and control to said electric motors.

6. The gas turbine engine as set forth in claim 5, wherein said controller also communicates with said data and power bus.

7. The gas turbine engine as set forth in claim 1, wherein said firewall includes openings at an inner periphery to receive air, and said openings communicate with a manifold formed radially across an extent of said firewall.

8. The gas turbine engine as set forth in claim 7, wherein there are a plurality of said manifolds positioned circumferentially spaced about said firewall.

9. The gas turbine engine as set forth in claim 8, wherein there are intermediate structural portions between said plurality of said manifolds.

10. The gas turbine engine as set forth in claim 7, wherein a bypass duct is positioned radially outward of said compressor section, and outlet ports of said manifold communicating air into a bypass stream in said bypass duct.

11. The gas turbine engine as set forth in claim 1, wherein said higher pressure compressor section is provided with variable vanes and an actuator mechanism for said variable vanes is at said downstream side of said firewall, with at least one of said electric motors being for driving said actuator mechanism.

12. The gas turbine engine as set forth in claim 1, wherein said firewall includes openings at an inner periphery to receive air, and said openings communicate with a manifold formed radially across an extent of said firewall.

13. The gas turbine engine as set forth in claim 12, wherein there are a plurality of said manifolds positioned circumferentially spaced about said firewall.

14. The gas turbine engine as set forth in claim 13, wherein there are intermediate structural portions between said plurality of said manifolds.

15. The gas turbine engine as set forth in claim 14, wherein said electric motors being mounted on said intermediate structural portions.

16. The gas turbine engine as set forth in claim 12, wherein a bypass duct is positioned radially outward of said compressor section, and an outlet port of said manifold communicating air into a bypass stream in said bypass duct.

17. The gas turbine engine as set forth in claim 1, wherein a controller for providing control signals to said electric motors is also mounted on said upstream side of said firewall.

18. The gas turbine engine as set forth in claim 1, wherein a data and power bus is provided on said upstream side of said firewall to provide power and control to said electric motors.

19. The gas turbine engine as set forth in claim 18, wherein a controller for said motors also communicates with said data and power bus.

20. The gas turbine engine as set forth in claim 1, wherein a fan delivers air into said compressor section, and further into a bypass duct outwardly of a housing, with said firewall being positioned inwardly of said housing.

\* \* \* \* \*